Patented Nov. 4, 1952

2,616,882

UNITED STATES PATENT OFFICE 2,616,882

SHORTSTOPPING VINYL CHLORIDE POLYMERIZATIONS WITH VINYL PYRIDINES

Dexter C. Seymour, Wyckoff, N. J., assignor to United States Rubber Company, New York, N. Y., a corporation of New Jersey No Drawing. Application July 10, 1951, Serial No. 236,063

10 Claims. (Cl. 260—92.8)

This invention relates to improvements in vinyl chloride polymerizations.

The polymerization of liquefied vinyl chloride is generally carried out at mildly elevated temperatures, about 40° C. to 60° C., in an aqueous medium under a pressure substantially equal to its saturated vapor pressure, i. e. about 4 to 9 atmospheres, in the presence of a polymerization catalyst. Pressures referred to herein are absolute pressures. The polymerization is generally carried to a range of about 60% to 95% conversion of monomer to polymer. Percentages and parts referred to herein are by weight. The polymerization as is well known may be an emulsion polymerization (see Mark et al. U. S. Patent 2,068,424, and "German Plastics Practice" by DeBell, Goggin & Gloor, Pub. by DeBell and Richardson, Springfield, Mass., 1946, pages 57–66), or a granular polymerization (see Lightfoot U. S. Patent 2,511,593, and "German Plastics Practice," pages 66–73, and the article by Ruebensaal on "Vinyl Resins" in Chemical Engineering for December 1950, vol. 57, pages 102 to 105). After conversion of the desired amount of monomer to polymer, residual unreacted monomeric vinyl chloride is removed and the polyvinyl chloride collected by various means, such as by coagulation or spray drying in the case of aqueous emulsion polymerization, or by filtration in the case of aqueous granular polymerization. The resulting polyvinyl chloride is usually washed with water and dried. If the polymerization goes beyond the desired conversion, a polymer having physical properties inferior to those desired in the final product may result, particularly as regards heat and light stability. To avoid this, the batch is generally cooled after the desired conversion. Undesirable post-polymerization may also take place in the blow-down tank or in the stripper where unreacted vinyl chloride monomer is removed. At the end of the polymerization, it may be necessary to store or hold the polymer batch for some time without cooling before removing unreacted vinyl chloride monomer. In this case the polymerization may continue during storage and thus give a product of too high conversion and of resultant undesirable properties. Also, when the unreacted vinyl chloride monomer is removed from the aqueous medium, there may be some vinyl chloride monomer adsorbed on the polyvinyl chloride particles in the aqueous medium, which is not removed until drying of the polyvinyl chloride. This adsorbed vinyl chloride monomer may polymerize on the polyvinyl chloride particles before it can be removed, adversely affecting the properties of the finally recovered polyvinyl chloride. It is therefore desirable to add a material which acts to terminate or "shortstop" the vinyl chloride polymerization reaction after the desired partial conversion of polymerizable monomer to polymer has taken place and to prevent any further polymerization of the residual unreacted vinyl chloride monomer.

I have found that vinyl pyridines are effective shortstopping agents for vinyl chloride polymerizations.

In carrying out the present invention, the vinyl pyridine is added to the polymerization reaction after partial conversion of polymerizable monomer to polymer (usually after about 60% to 95% conversion) and thereafter the unreacted vinyl chloride polymer is removed from the aqueous medium, and the polyvinyl chloride recovered in the usual manner. Examples of vinyl pyridines that may be used are position isomers 2-vinyl pyridine, 3-vinyl pyridine, and 4-vinyl pyridine, and position isomers having alkyl substituents in the pyridine ring 2-methyl-5-vinyl pyridine, 5-ethyl - 2 - vinyl pyridine, 2,4 - dimethyl - 6 - vinyl pyridine, and mixtures thereof. Very small amounts of such vinyl pyridines may satisfactorily be used to shortstop the polymerization reaction, the amount effective to shortstop the polymerization generally being less than 2% based on the original vinyl chloride monomer used. For practical purposes, the amount of shortstopper may be between 0.05% and 1% by weight of the original vinyl chloride monomer used.

The polymerization reaction is carried out in the presence of a conventional free radical type polymerization initiator, such as a peroxygen or azo catalyst. Examples of peroxygen catalysts are inorganic peroxides, e. g. hydrogen peroxide and persalts, such as alkali persulfates, alkali perborates, alkali percarbonates; and organic peroxides, e. g. diacetyl peroxide, dibenzoyl peroxide, acetyl benzoyl peroxide, lauroyl peroxide, cumene hydroperoxide, tertiary butyl hydroperoxide. Examples of azo catalysts are alpha, alpha'-azobisisobutyronitrile, and p-methoxybenzene diazo thio-2-naphthyl ether. Catalytic amounts from 0.05% to 2% based on the vinyl chloride monomer may be used.

Tests showing the effectiveness of the chemicals of the present invention as shortstopping agents for vinyl chloride polymerization were carried out according to the following procedure: Into a Carius pressure tube was weighed 0.5328 g. (0.00325 mole) of catalyst (alpha, alpha'-azobisisobutyronitrile) and the tube was sealed to a vacuum line. After evacuation to 0.0001 mm., 20.00 cc. (19.94 g., 0.319 mole volume measured at −30° C.) of pure vinyl chloride was distilled in and the tube was sealed off and heated at 30° C. for 4.5 hours. At the end of this time the contents were frozen in liquid nitrogen, the tube was opened, sealed to the vacuum line and evacuated. The unreacted vinyl chloride was distilled into a buret and its volume at −30° C. noted. From this was calculated the percent conversion before adding shortstop. Meanwhile, the tube was removed from the vacuum line and to it was added one weight percent on the original vinyl chloride of the chemical under test as a shortstop. The tube was resealed to the vacuum line, its unreacted vinyl chloride was replaced, the tube was sealed off under vacuum and heated again at 30° C. for 4.5 hours. After the second heating period the tube was frozen, opened and sealed to the line as before. A final measurement of the volume of unreacted vinyl chloride was made and the percent conversion after adding shortstop was calculated. The difference between these two conversions was taken as a measure of the shortstopping power of the compound under investigation. A control run without shortstop was carried out as a means of comparison. Results of these tests are shown in the following table:

| Chemical Added after 4.5 hrs. | Percent Conversion at 4.5 hrs. | Percent Conversion at 9 hrs. | Percent Conversion Increase in Final 4.5 hrs. |
|---|---|---|---|
| 2 Vinyl pyridine | 20.6 | 20.6 | 0.0 |
| None (control) | 14.1 | 31.7 | 17.6 |

Further tests showing the effectiveness of the chemicals of the present invention as shortstopping agents for vinyl chloride polymerization were carried out according to the following procedure: Into each of two reaction vessels was introduced 200 parts of water, 100 parts of liquid vinyl chloride, 1.3 parts of emulsifying and buffering agents, and 0.2 part of potassium persulfate catalyst. The reaction vessels were agitated in a constant temperature bath at 45° C. for about 7 hours, at which time analyses showed a conversion of monomer to polymer of approximately 60%. At this point 0.5 part of 2-vinyl pyridine was added to one of the reaction vessels and no chemical was added to the other vessel (control polymerization). The agitation of the vessels in the 45° C. bath was continued for 5 hours more. At the end of this time analysis showed no increase in the 60% conversion where the 2-vinyl pyridine had been added, and substantially 100% conversion in the case of the control where no shortstop had been added.

The above work shows the effectiveness of the chemicals as shortstopping agents in the difficultly shortstopped early stages of bulk or mass "oil-phase" vinyl chloride polymerization, and in emulsion polymerization. The chemicals of the present invention are also effective as shortstoppers for granular polymerizations which may use inorganic water-soluble catalysts or organic monomer-soluble catalysts. In fact, granular polymerizations which use a monomer soluble catalyst are generally considered to be mass polymerizations of the individual liquid monomer globules. In aqueous emulsion and granular polymerizations, the polymerization reaction is generally stopped at 60% to 95% conversion of monomer to polymer. In bulk polymerizations, the polymerization reaction is generally stopped at lower conversions, e. g., around 40%. With the shortstopping agents of the present invention, the polymerization reaction may be stopped at any desired conversion.

In emulsion polymerizations, it is a simple matter to withdraw a sample from the reaction chamber from time to time and to analyze it for total solids in order to determine the percent conversion. On the other hand, it is almost impossible to follow the conversion in a granular polymerization by sampling, because the polymer formed separates so rapidly that a representative sample cannot be obtained. Thus other methods of determining the amount of conversion, and thereby the point at which the reaction should be stopped, must be used in following polyvinyl chloride granular polymerizations. For example, the heat evolved in the reaction mixture can be measured and be directly correlated with the extent of conversion via the known heat of reaction. Also, experience has shown that polyvinyl chloride of good physical characteristics may be obtained by stopping the reaction at the pressure drop which is at the point where the separate phase of liquid vinyl chloride monomers disappears (see "German Plastics Practice," pages 61 and 77). In systems where the temperature in the reactor is automatically maintained by regulation of the jacket temperature, the pressure drop will be evidenced by a sudden pressure fall. In systems where the pressure in the reactor is automatically maintained by regulation of the jacket temperature, the pressure drop will be evidenced by a rapid rise in jacket water temperature, whereupon the system is thrown out of automatic control and cooling water is introduced into the jacket resulting in the usual fall of pressure in the reactor. Such methods other than sample analyses of determining when to shortstop the reaction at the desired conversion may be used in emulsion polymerization as well as in granular polymerization. The evolution of heat or the viscosity characteristics may be followed in mass polymerization to determine the point at which the shortstopping agent should be added.

The following illustrates the use of the shortstoppers of the present invention in batch aqueous vinyl chloride polymerizations. A typical emulsion polymerization recipe which uses a water soluble catalyst (100 parts of liquefied vinyl chloride, 200 parts of water, 0.2 part of potassium persulfate and 1.5 parts of surface-active emulsifying agent), or a typical granular polymerization recipe using a water-soluble catalyst (100 parts of liquefied vinyl chloride, 300 parts of water, 0.3 part of potassium persulfate, and a small amount of buffering and wetting agents), or a typical granular polymerization recipe using a monomer-soluble catalyst (100 parts of liquefied vinyl chloride, 300 parts of water, 0.5 part of lauroyl peroxide and a small amount of suspending agent) is agitated in a closed jacketed reaction vessel. The batch is initially heated to the desired reaction temperature between 40° C. and 60° C. and maintained at the desired temperature during the polymerization. The pressure in the reactor at such reaction temperatures will be from 4 to 9 atmospheres until the liquid vinyl chloride is polymerized and the pressure drops. After the pressure starts to drop and before it drops 2 atmospheres, 0.05 to 1 part of 2-vinyl pyridine, 3-vinyl pyridine, 4-vinyl pyridine, 2-methyl-5-vinyl pyridine, 5-ethyl-2-vinyl pyridine, or 2,4-dimethyl-6-vinyl pyridine per 100 parts of original vinyl chloride used is added so that undesirable further polymerization is prevented. Alternatively, the shortstopping agent may be added at any desired conversion at the discretion of the operator. When the desired conversion has been reached and the shortstop added, the batch may be transferred to the "blow down" or storage tank, held there any desired length of time, and then transferred to the stripper when desired for removal of residual unreacted vinyl chloride monomer. Finishing operations after residual monomer removal are conventional as described in the literature references referred to above. The shortstopping agents of the present invention give a greater uniformity of polymer properties, and also result in polymers having enhanced heat and light stability.

The shortstoppers of the present invention are applicable to shortstopping of modified vinyl chloride polymers which are made by copolymerizing a major proportion, generally over 80% of vinyl chloride and up to 20% of other monoolefinic material which is copolymerizable with vinyl chloride, such as a vinyl alkanoate, e. g. vinyl acetate, or vinylidene chloride, or an alkyl acrylate, e. g. methyl methacrylate, or an alkyl maleate, e. g. dimethyl maleate, diethyl maleate, isobutyl maleate, and mixtures thereof. Such polymerizations are similar to the homopolymerization of polyvinyl chloride but with a somewhat broader range of reaction temperatures from 25° C. to 100° C., depending on the particular vinyl chloride copolymer being made (see "German Plastics Practice," pages 76–78). The same amount of shortstopping agent based on the amount of vinyl chloride employed may be added after partial conversion, generally at about 60% to 95% conversion of polymerizable monomeric material to polymeric material.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the process of preparing a vinyl chloride polymer by the polymerization of material of the group consisting of vinyl chloride and mixtures of vinyl chloride with up to 20% by weight of the vinyl chloride of other monoolefinic material which is copolymerizable with vinyl chloride, the step comprising adding a small amount of a vinyl pyridine in which any substituents are alkyl ring substituents to the reaction mixture during polymerization to stop the same after partial conversion of polymerizable monomeric material to polymeric material.

2. In the process of preparing a vinyl chloride polymer by the polymerization of material of the group consisting of vinyl chloride and mixtures of vinyl chloride with up to 20% by weight of the vinyl chloride of other monoolefinic material which is copolymerizable with vinyl chloride, the step comprising adding a small amount of vinyl pyridine selected from the group consisting of 2-vinyl pyridine, 3-vinyl pyridine, 4-vinyl pyridine, 2-methyl-5-vinyl pyridine, 5-ethyl-2-vinyl pyridine, and 2,4-dimethyl-6-vinyl pyridine to the reaction mixture during polymerization to stop the same after partial conversion of polymerizable monomeric material to polymeric material.

3. In the process of preparing a vinyl chloride polymer by the polymerization of material of the group consisting of vinyl chloride and mixtures of vinyl chloride with up to 20% by weight of the vinyl chloride of other monoolefinic material which is copolymerizable with vinyl chloride, the step comprising adding a small amount of 2-vinyl pyridine to the reaction mixture during polymerization to stop the same after partial conversion of polymerizable monomeric material to polymeric material.

4. In the process of preparing polyvinyl chloride by the polymerization of vinyl chloride in an aqueous medium, the step comprising adding 0.05% to 1% of a vinyl pyridine in which any substituents are alkyl ring substituents based on the weight of the monomeric vinyl chloride being used to the reaction mixture during polymerization to stop the same after about 60% to 95% conversion of vinyl chloride monomer to polyvinyl chloride.

5. The method of preparing a vinyl chloride polymer which comprises subjecting material of the group consisting of vinyl chloride and mixtures of vinyl chloride with up to 20% by weight of the vinyl chloride of other monoolefinic material which is copolymerizable with vinyl chloride to polymerizing conditions in an aqueous medium in the presence of a polymerization catalyst, and after about 60% to 95% conversion of polymerizable monomeric material to polymeric material adding to the polymerization reaction 0.05% to 1% based on the weight of the original monomeric vinyl chloride used of a vinyl pyridine in which any substituents are alkyl ring substituents to stop polymerization of unreacted polymerizable monomeric material, and thereafter removing unreacted polymerizable monomeric material from the aqueous medium.

6. The method of preparing a vinyl chloride polymer which comprises subjecting material of the group consisting of vinyl chloride and mixtures of vinyl chloride with up to 20% by weight of the vinyl chloride of other monoolefinic material which is copolymerizable with vinyl chloride to polymerizing conditions in an aqueous medium in the presence of a polymerization catalyst, and after about 60% to 95% conversion of polymerizable monomeric material to polymeric material adding to the polymerization reaction 0.05% to 1% based on the weight of the original monomeric vinyl chloride used of vinyl pyridine selected from the group consisting of 2-vinyl pyridine, 3-vinyl pyridine, 4-vinyl pyridine, 2-methyl-5-vinyl pyridine, 5-ethyl-2-vinyl pyridine, and 2,4-dimethyl-6-vinyl pyridine to stop polymerization of unreacted polymerizable monomeric material, and thereafter removing unreacted polymerizable monomeric material from the aqueous medium.

7. The method of preparing polyvinyl chloride which comprises subjecting vinyl chloride to polymerizing conditions in an aqueous medium in the presence of a peroxygen catalyst, and after partial conversion of vinyl chloride monomer to polyvinyl chloride adding to the polymerization reaction a small amount of a vinyl pyridine in which any substituents are alkyl ring substituents to stop polymerization of unreacted vinyl chloride monomer, and thereafter removing unreacted vinyl chloride from the aqueous medium.

8. The method of preparing polyvinyl chloride which comprises subjecting vinyl chloride to polymerizing conditions in a closed vessel in an aqueous medium at a temperature between 40° C. and 60° C. under a pressure substantially equal to its saturated vapor pressure of about 4 to 9 atmospheres, and after the pressure begins to drop and before it has dropped 2 atmospheres adding to the polymerization reaction a small amount of a vinyl pyridine in which any substituents are alkyl ring substituents to stop polymerization of unreacted vinyl chloride monomer, and thereafter removing unreacted vinyl chloride from the aqueous medium.

9. The method of preparing polyvinyl chloride which comprises subjecting vinyl chloride to polymerizing conditions in a closed vessel in an aqueous medium at a temperature between 40° C. and 60° C. under a pressure substantially equal to its saturated vapor pressure of about 4 to 9 atmospheres, and after the pressure begins to drop and before it has dropped 2 atmospheres adding to the polymerization reaction a small amount of vinyl pyridine selected from the group consisting of 2-vinyl pyridine, 3-vinyl pyridine, 4-vinyl pyridine, 2-methyl-5-vinyl pyridine, 5-ethyl-2-vinyl pyridine, and 2,4-dimethyl-6-vinyl pyridine to stop polymerization of unreacted vinyl chloride monomer, and thereafter removing unreacted vinyl chloride from the aqueous medium.

10. The method of preparing polyvinyl chloride which comprises subjecting vinyl chloride to polymerizing conditions in a closed vessel in an aqueous medium at a temperature between 40° C. and 60° C. under a pressure substantially equal to its saturated vapor pressure of about 4 to 9 atmospheres, and after the pressure begins to drop and before it has dropped 2 atmospheres adding to the polymerization reaction a small amount of 2-vinyl pyridine to stop polymerization of unreacted vinyl chloride monomer, and thereafter removing unreacted vinyl chloride from the aqueous medium.

DEXTER C. SEYMOUR.

No references cited.